US012037170B2

(12) United States Patent
Vera

(10) Patent No.: US 12,037,170 B2
(45) Date of Patent: Jul. 16, 2024

(54) SAFETY COVER BOX

(71) Applicant: Yader Vera, Gaithersburg, MD (US)

(72) Inventor: Yader Vera, Gaithersburg, MD (US)

( * ) Notice: Subject to any disclaimer, the term of this patent is extended or adjusted under 35 U.S.C. 154(b) by 265 days.

(21) Appl. No.: 17/690,359

(22) Filed: Mar. 9, 2022

(65) Prior Publication Data

US 2022/0289440 A1 Sep. 15, 2022

Related U.S. Application Data

(60) Provisional application No. 63/158,562, filed on Mar. 9, 2021.

(51) Int. Cl.

| | |
|---|---|
| ***B65D 55/14*** | (2006.01) |
| ***B65D 43/02*** | (2006.01) |
| ***B65D 85/00*** | (2006.01) |
| ***E05B 37/00*** | (2006.01) |
| ***E05B 65/52*** | (2006.01) |

(52) U.S. Cl.

CPC ....... *B65D 55/145* (2013.01); *B65D 43/0204* (2013.01); *B65D 85/00* (2013.01); *E05B 37/00* (2013.01); *E05B 65/5253* (2013.01); *B65D 2585/86* (2013.01)

(58) Field of Classification Search

CPC ... E05B 37/00; E05B 37/0031; B65D 55/145; B65D 55/14; B65D 55/02; B65D 43/0204; B65D 43/0202; B65D 43/02; B65D 43/00; B65D 85/00; B65D 2585/86

See application file for complete search history.

(56) References Cited

U.S. PATENT DOCUMENTS 4,063,110 A * 12/1977 Glick ................. H01R 13/6397 174/67
7,887,343 B2 * 2/2011 Ryan .................... H01R 25/003 439/144
10,665,978 B1 * 5/2020 Vera ................... H01R 13/6395
2006/0065422 A1 * 3/2006 Broyles ................ H01R 13/639 174/53

OTHER PUBLICATIONS

Lock-Me-Max Protector, Retrieved from Internet, Retrieved on Jan. 27, 2021 <URL: https://www.amazon.com/dp/B07FZTKJPP>.
Bluelounge CableBox, Retrieved from Internet, Retrieved on Jan. 27, 2021 <URL: https://www.amazon.com/Bluelounge-CableBox-organizer-tangled-cables/dp/B0019T0J9S>.
Power Strip Fixed Take-Up Box, Retrieved from Internet, Retrieved on Jan. 27, 2021 <URL: https://www.aliexpress.com//32968048082.html>.

* cited by examiner

*Primary Examiner* — Javier A Pagan

(57) ABSTRACT

A safety cover box is used to prevent unauthorized access to an electrical device stored within to vulnerable users such as children or pets. The safety cover box prevents harmful accidents by restricting access to the electrical connections of the electrical device. To do so, the safety cover box may include a safety lid, a box body, and a safety lock mechanism. The box body is designed to completely enclose the electrical device so that all electrical connections are safely protected. The box body also enables the normal operation of the electrical device without obstructing the connection of external electrical devices to the electrical device stored within the box body. The safety lid is designed to seal the box body to prevent access to the electrical device stored within. The safety lock mechanism is designed so that only authorized users can remove the safety lid from the box body.

19 Claims, 14 Drawing Sheets

SAFETY COVER BOX

FIELD OF THE INVENTION

The present invention generally relates to safety devices and electronic accessories. More specifically, the present invention provides a safety cover box that can be used to cover a power strip to prevent children from injuring themselves with the power strip.

BACKGROUND OF THE INVENTION

Nowadays, there are a variety of electrical fixtures and devices in a household. A common electrical element found aside from electrical outlets are extension cords and power strips. Both extension cords and power strips are risk-prone electrical devices which may easily lead or result in an accident, specially to children. There is a need to safely, conveniently, and neatly organize and store power cords and power strips in a convenient and secure manner. Hazard preventive apparatuses and/or hazard preventive measures are crucial, particularly in households with babies, infants, toddlers, and even pets. For instance, electrical receptacle protective enclosures (ERPE) are utilized to enclose high voltage or risk-prone electrical fixtures and/or elements. However, there is a lack of a safety device that completely covers an extension cord or power strip without obstructing with the operation of the device.

An objective of the present invention is to provide a safety cover box designed to safely secure and enclose power strips and similar electrical devices. The present invention completely encloses a power strip to prevent access to the electrical connections. Another objective of the present invention is to provide a safety cover box that does not obstruct with the operation of the electrical device while still maintaining desired safety levels. The present invention provides means to enable power cords to be normally connected to the power strip as well as to help maintain the several power cords organized. Further, another objective of the present invention is to provide a safety cover box that prevents unauthorized access to the electrical devices stored within. The present invention is designed to be safely locked so that unauthorized users, such as children, cannot open the present invention. Additional features and benefits of the present invention are further discussed in the sections below.

SUMMARY OF THE INVENTION

The present invention is a safety cover box designed to enclose an electrical device such as a power strip to prevent unauthorized access to the electrical connections to children, pets, etc. The present invention includes a box body designed to completely enclose the electrical device while also enabling the desired power cables to be normally connected to the electrical device. The box body also includes means to organize the several power cables to prevent tangling and possible accidents that may be caused by the tangling of the power cables. Further, the present invention includes a safety lid that seals the box body so that the unauthorized users cannot access the electrical device stored within the box body. The safety lid includes means to lock the connection between the box body and the safety lid so that only authorized users can remove the safety lid from the box body.

DETAIL DRAWINGS OF THE INVENTION

DETAIL DESCRIPTIONS OF THE INVENTION

Figure 1:
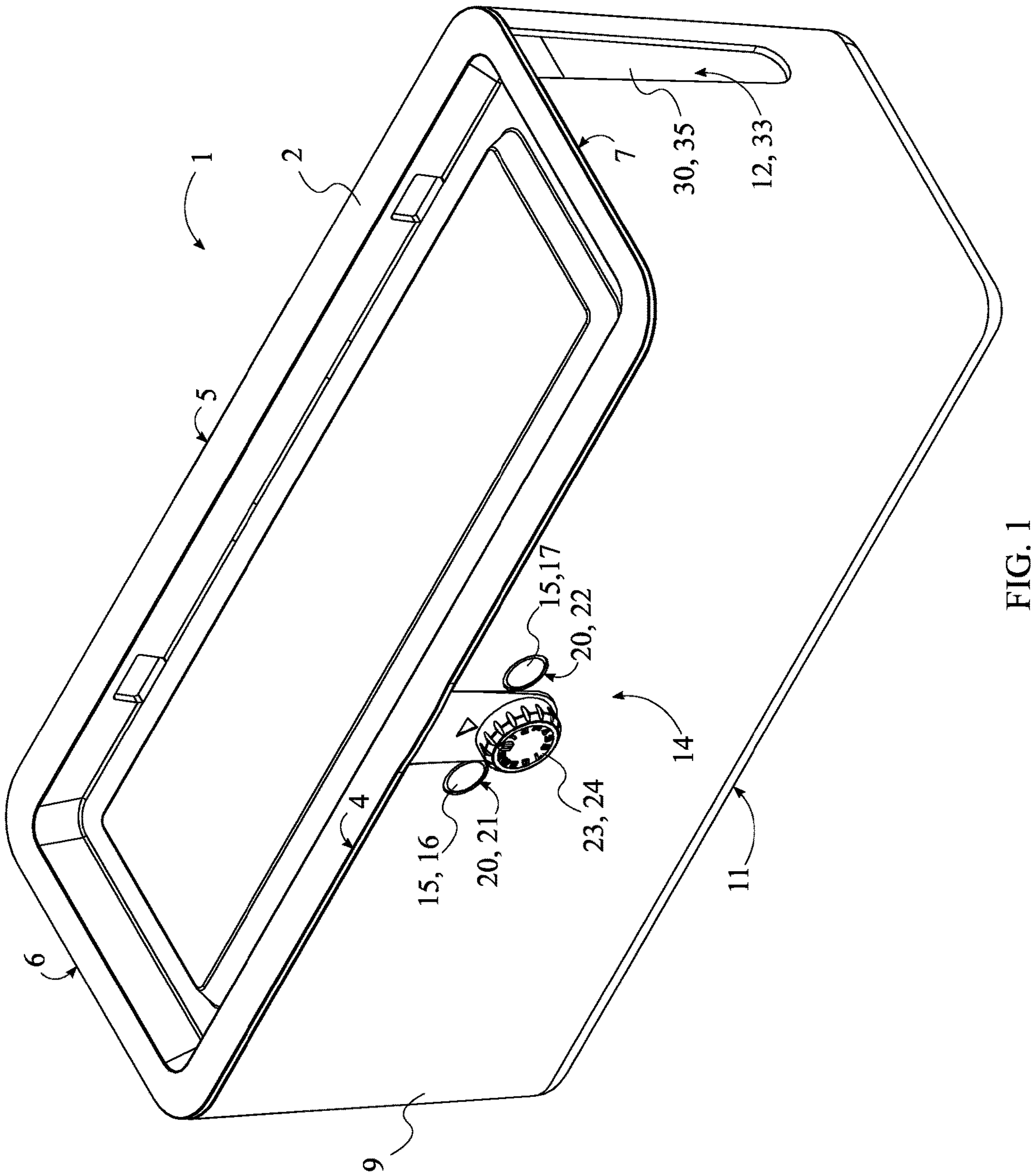
FIG. 1 is a top front perspective view of the present invention.
Figure 2:
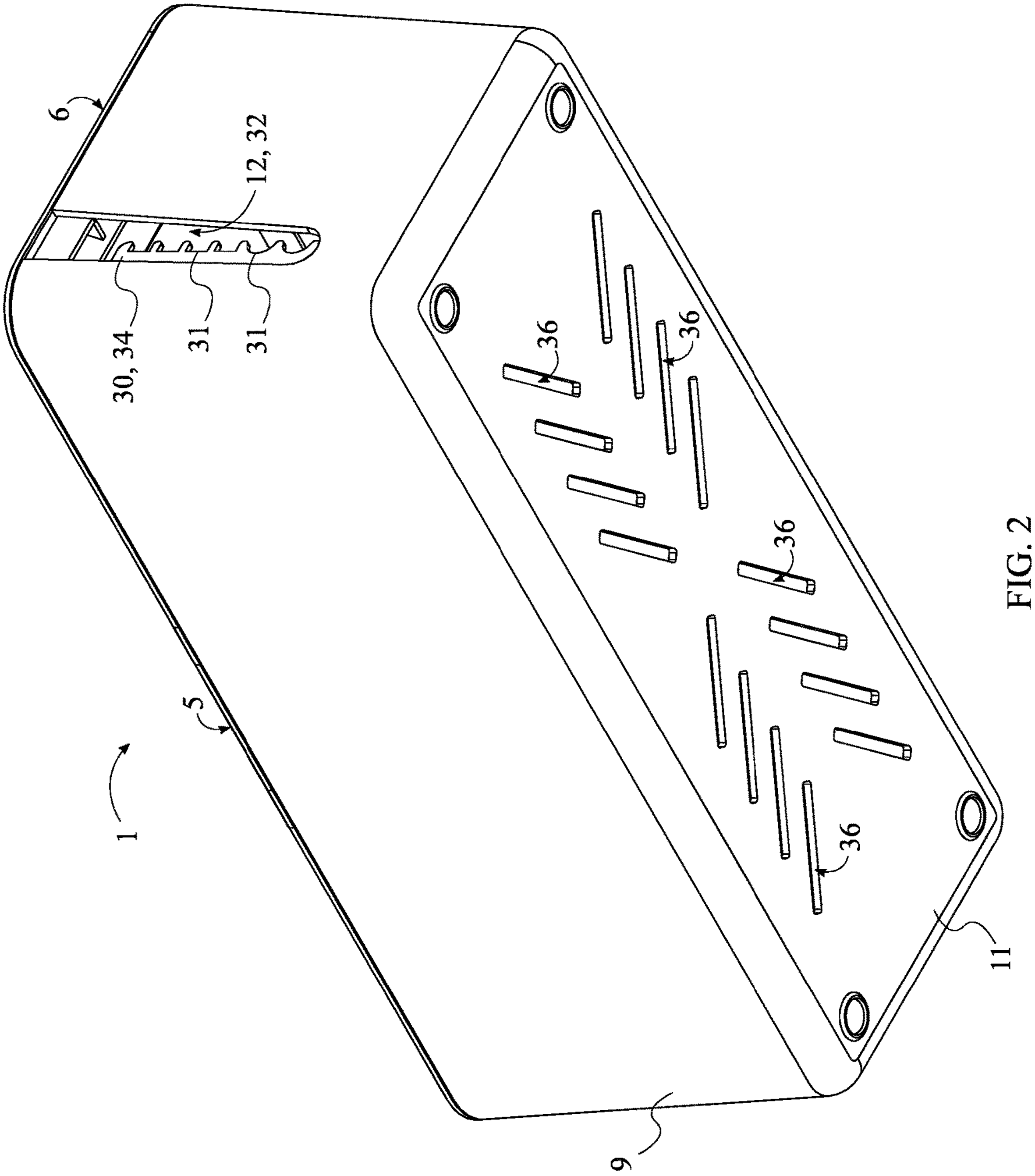
FIG. 2 is a bottom rear perspective view of the present invention.
Figure 3:
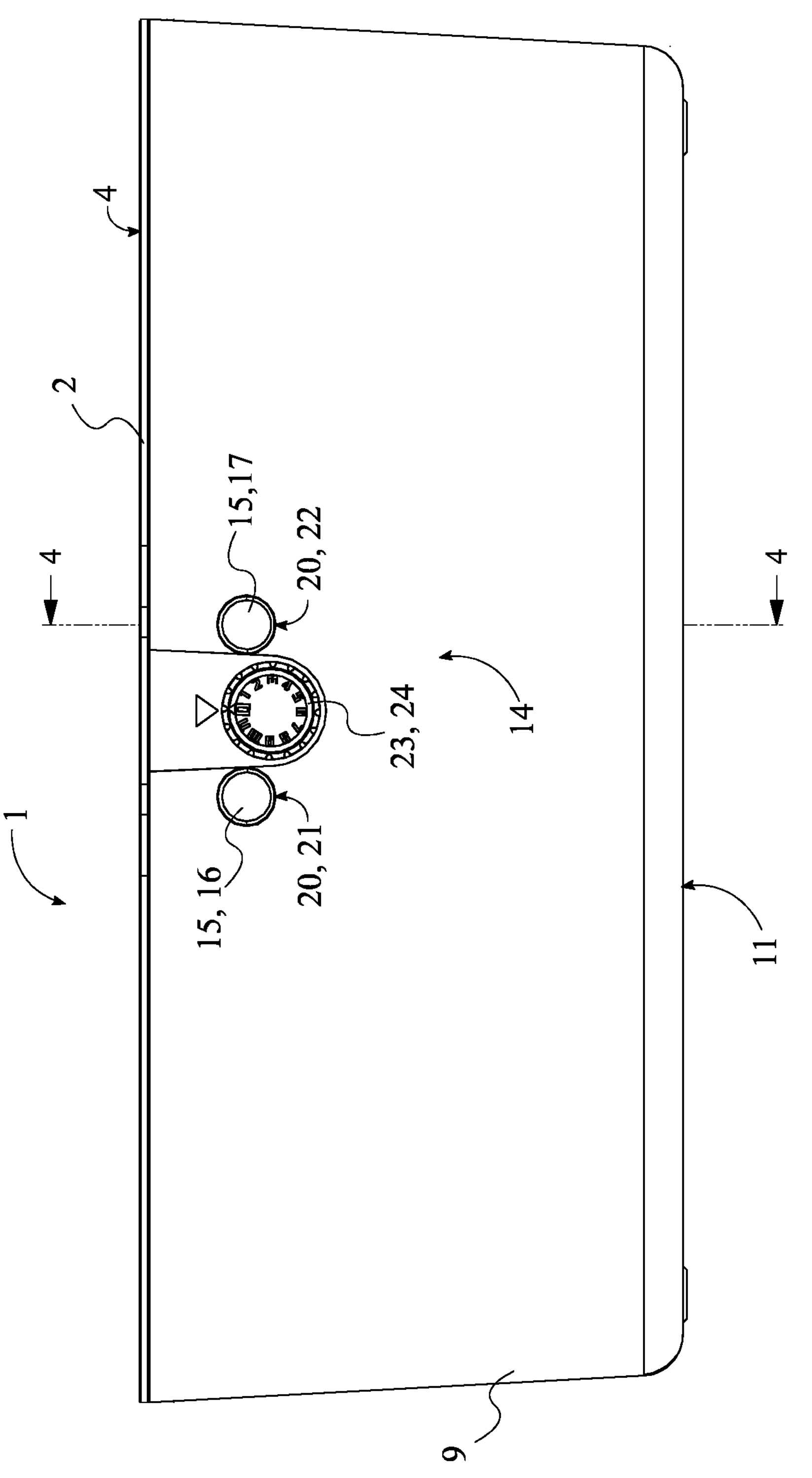
FIG. 3 is a front view of the present invention.
Figure 4:
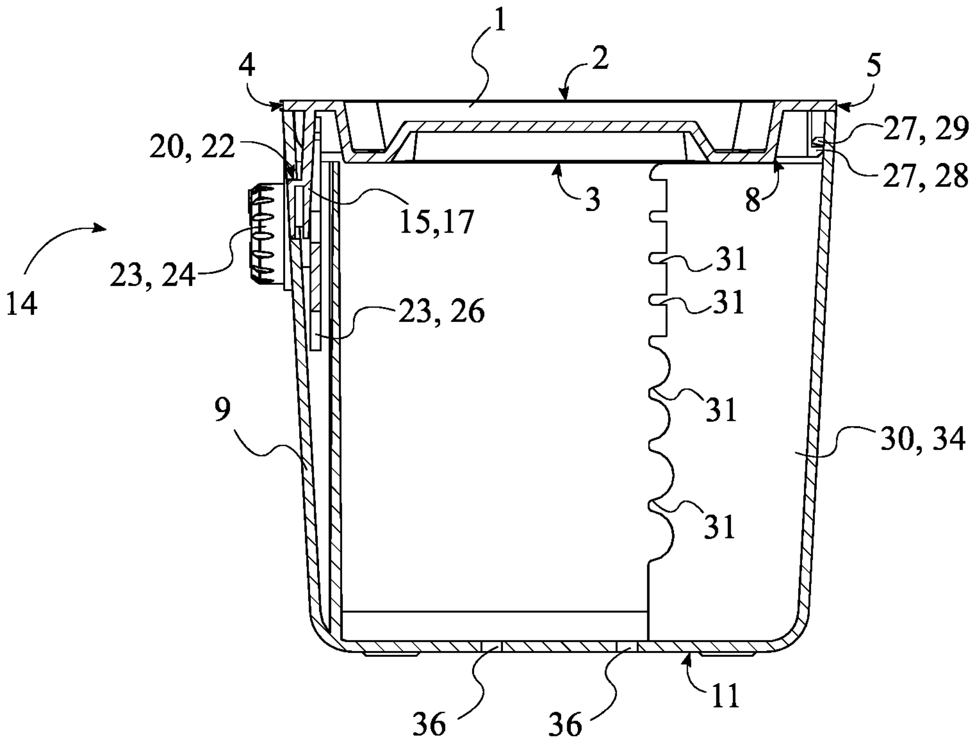
FIG. 4 is a vertical cross-sectional view taken in the direction of line 4-4 in FIG. 3.
Figure 5:
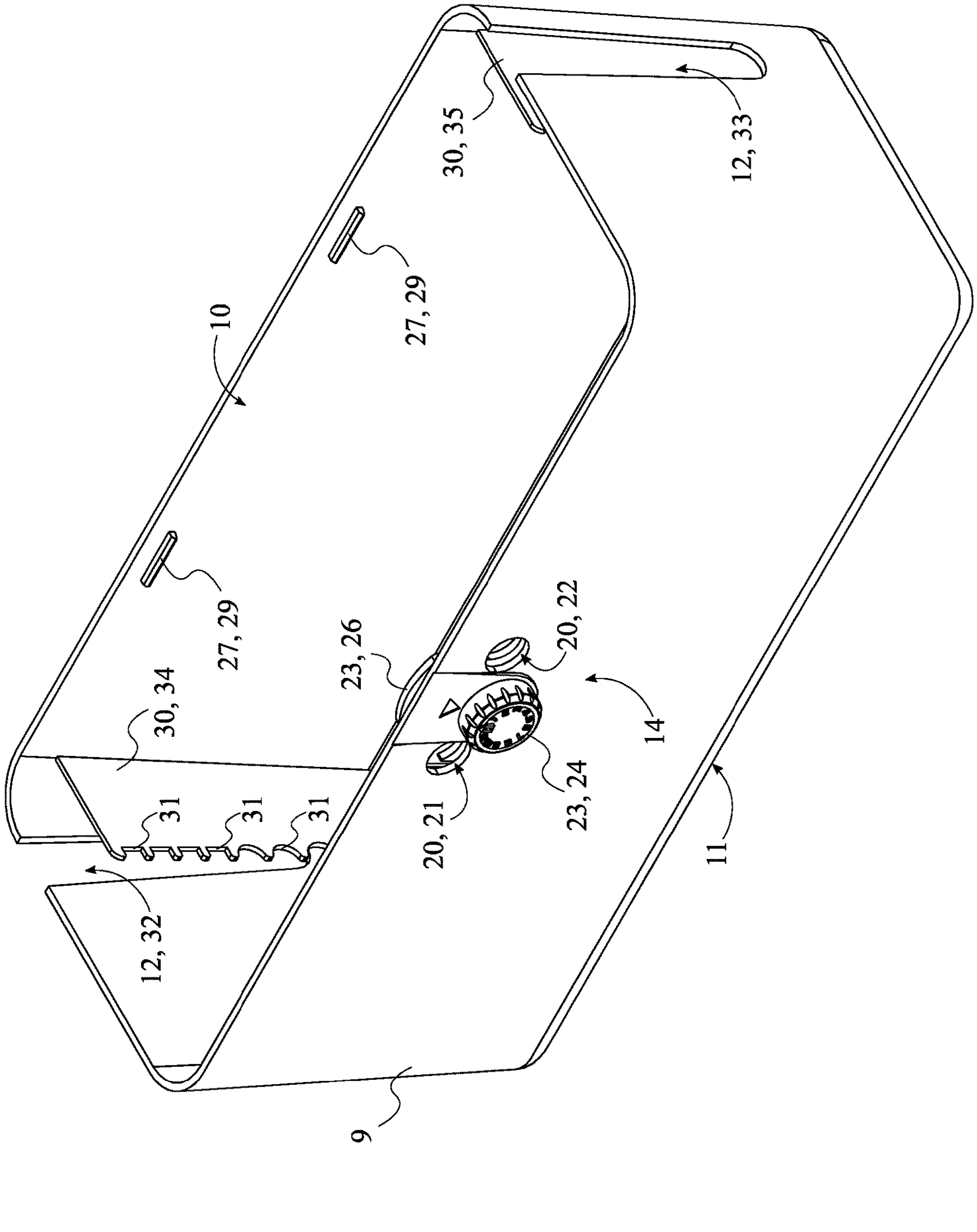
FIG. 5 is a top front perspective view of the box body of the present invention.
Figure 6:
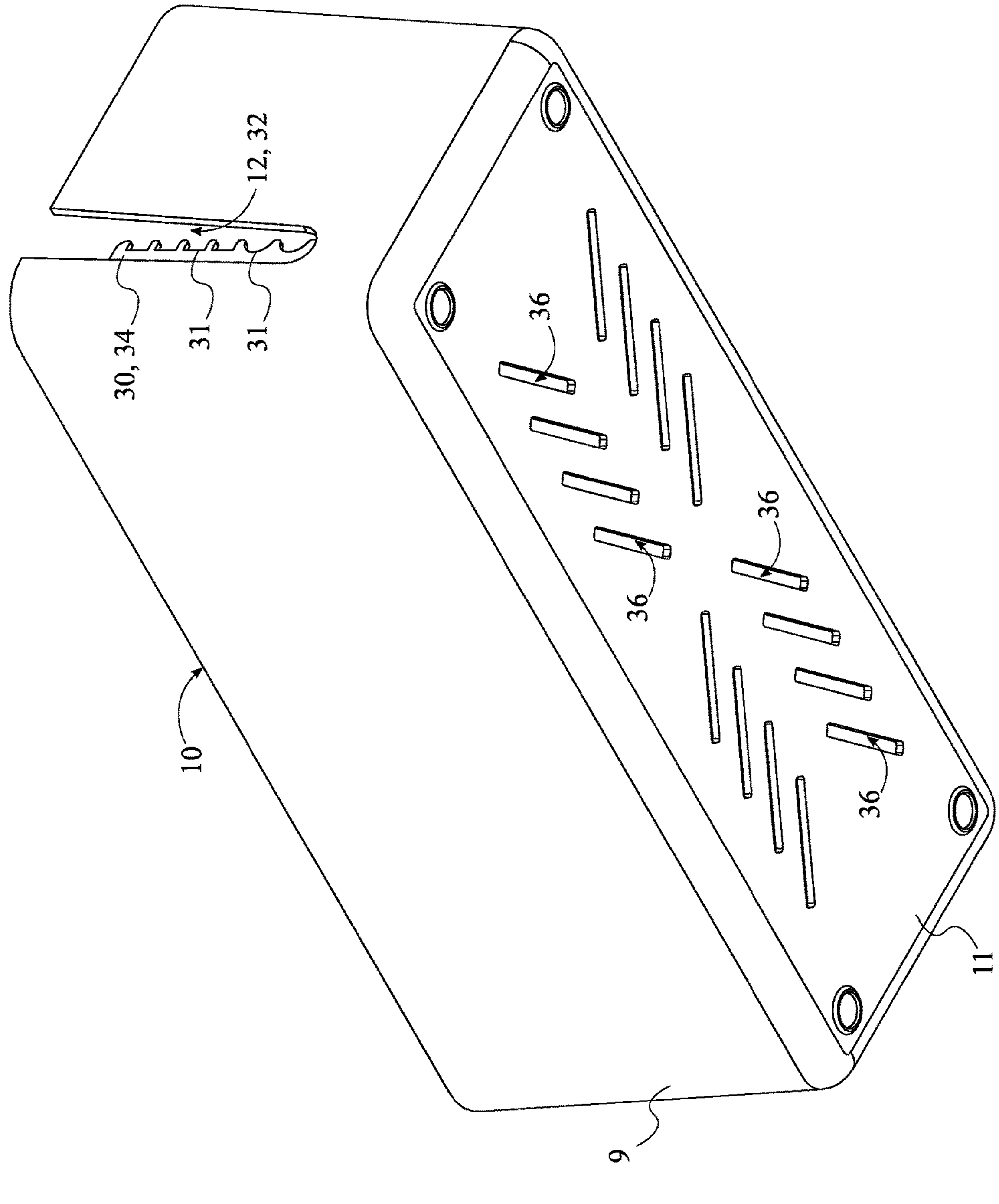
FIG. 6 is a bottom rear perspective view of the box body of the present invention.
Figure 7:
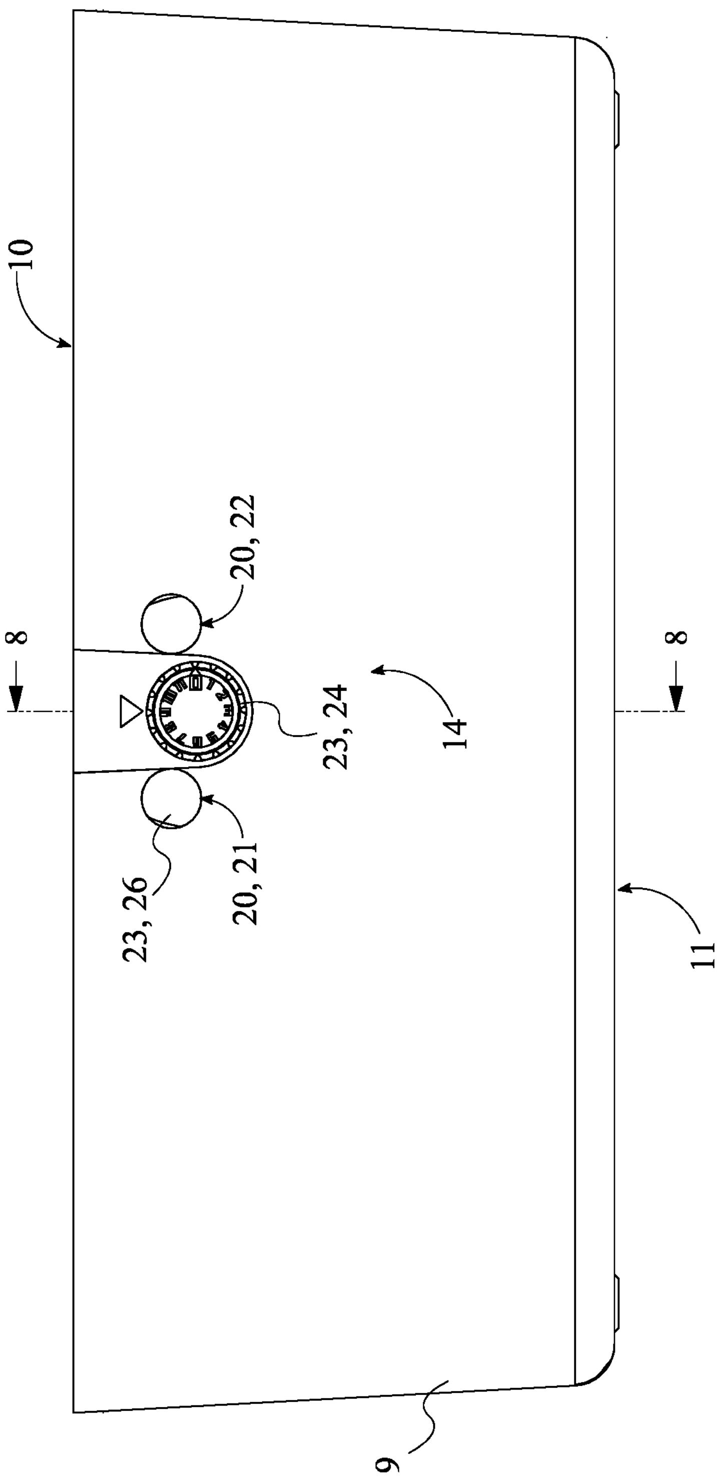
FIG. 7 is a front view of the box body of the present invention.
Figure 8:
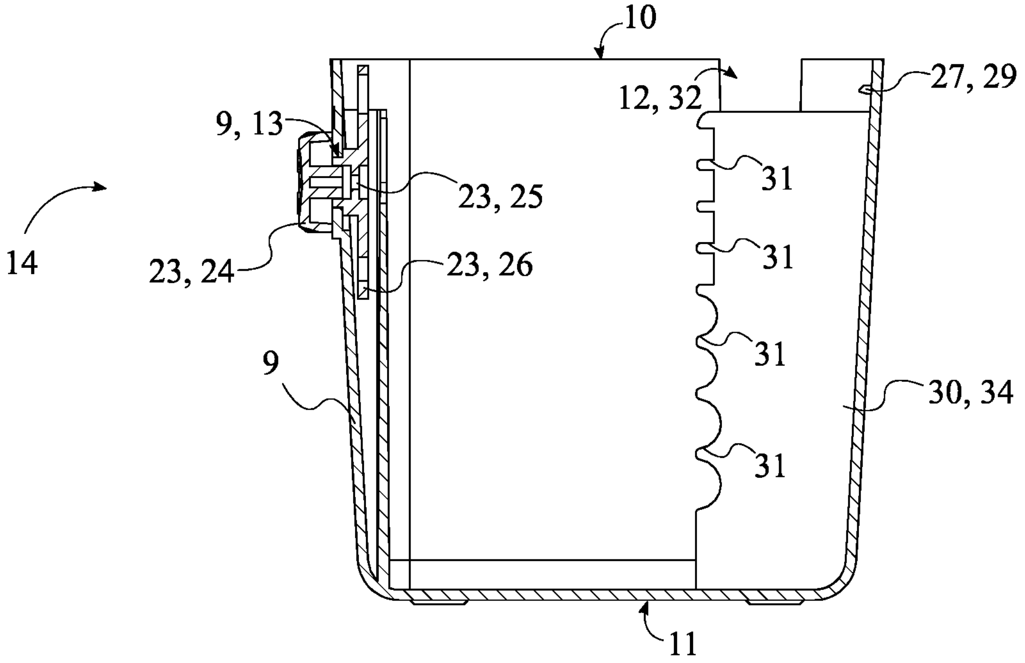
FIG. 8 is a vertical cross-sectional view taken in the direction of line 8-8 in FIG. 7.
Figure 9:
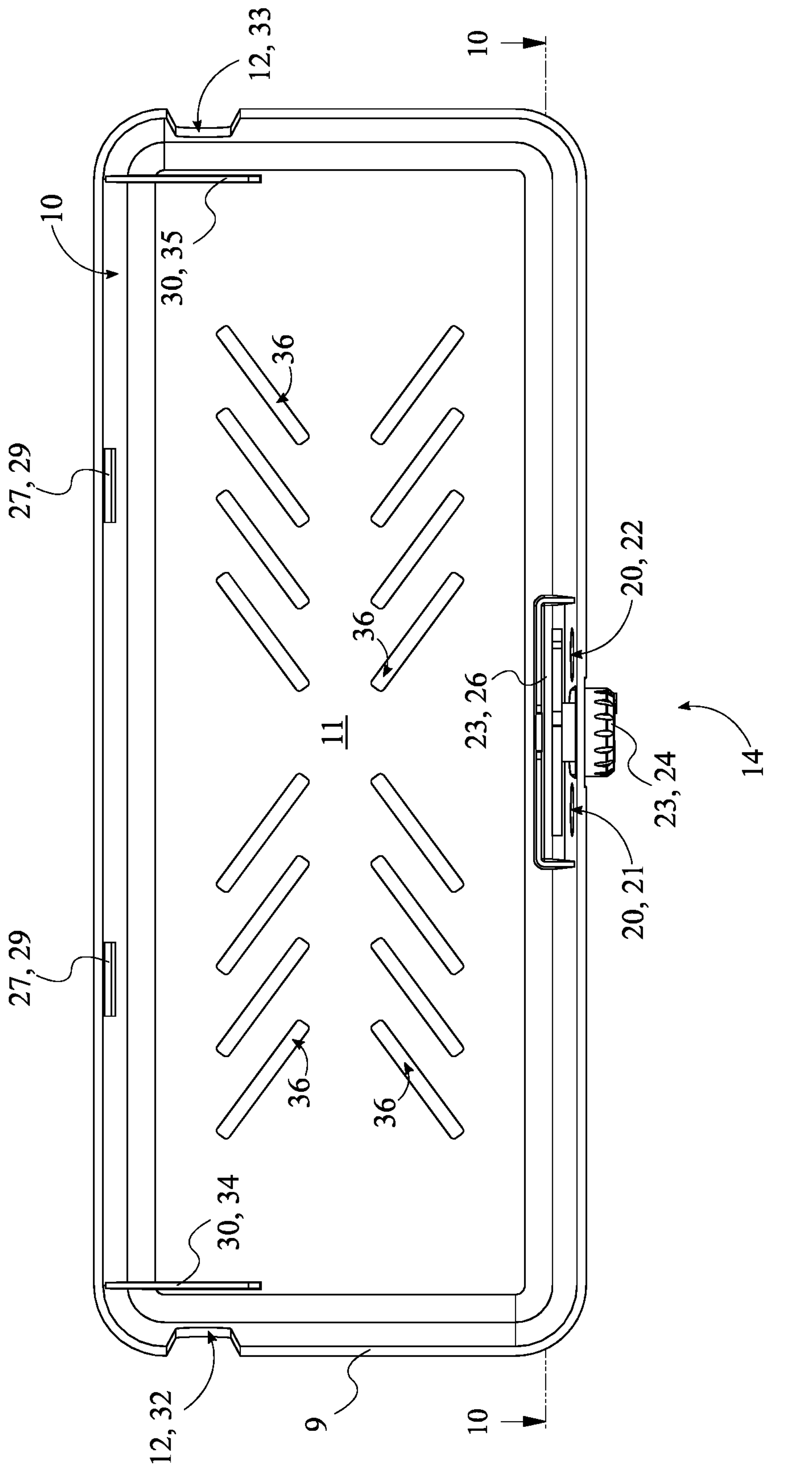
FIG. 9 is a top view of the box body of the present invention.
Figure 10:
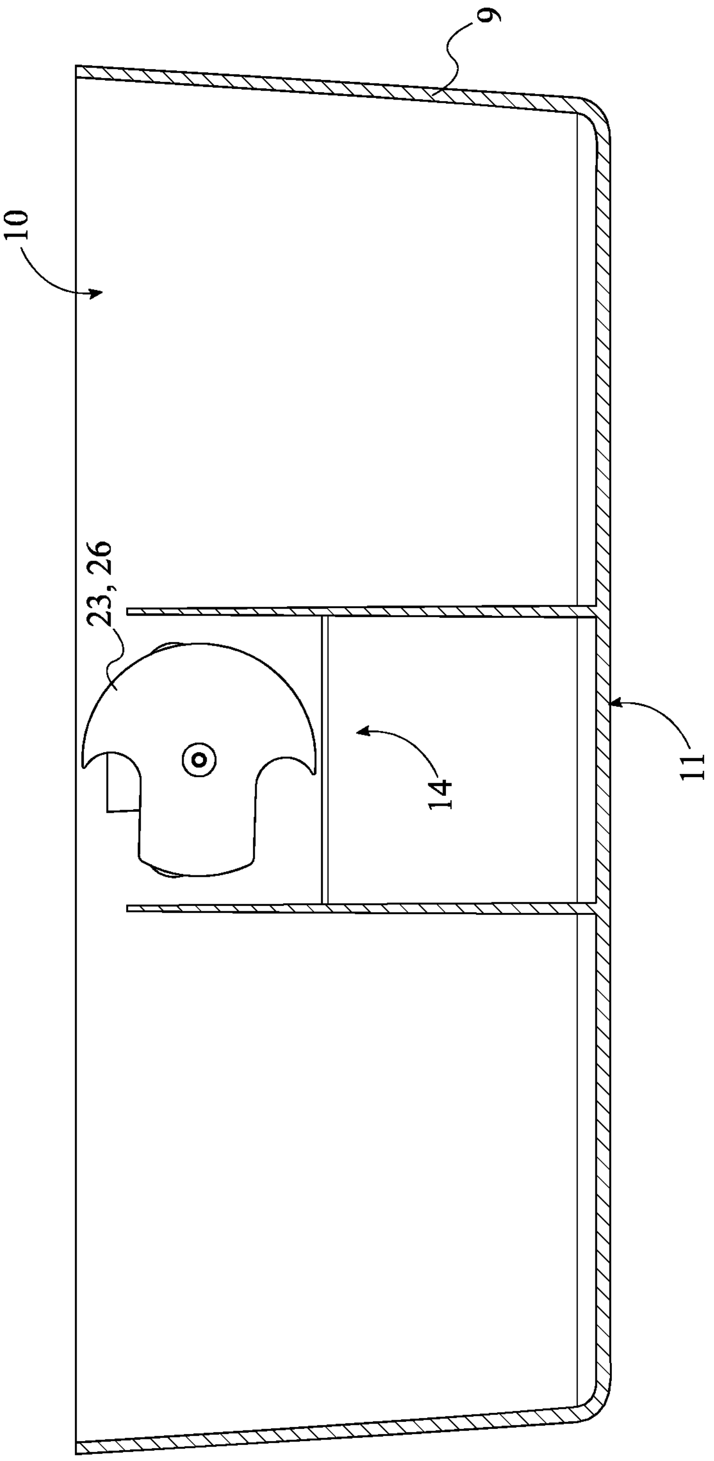
FIG. 10 is a horizontal cross-sectional view taken in the direction of line 10-10 in FIG. 9.
Figure 11:
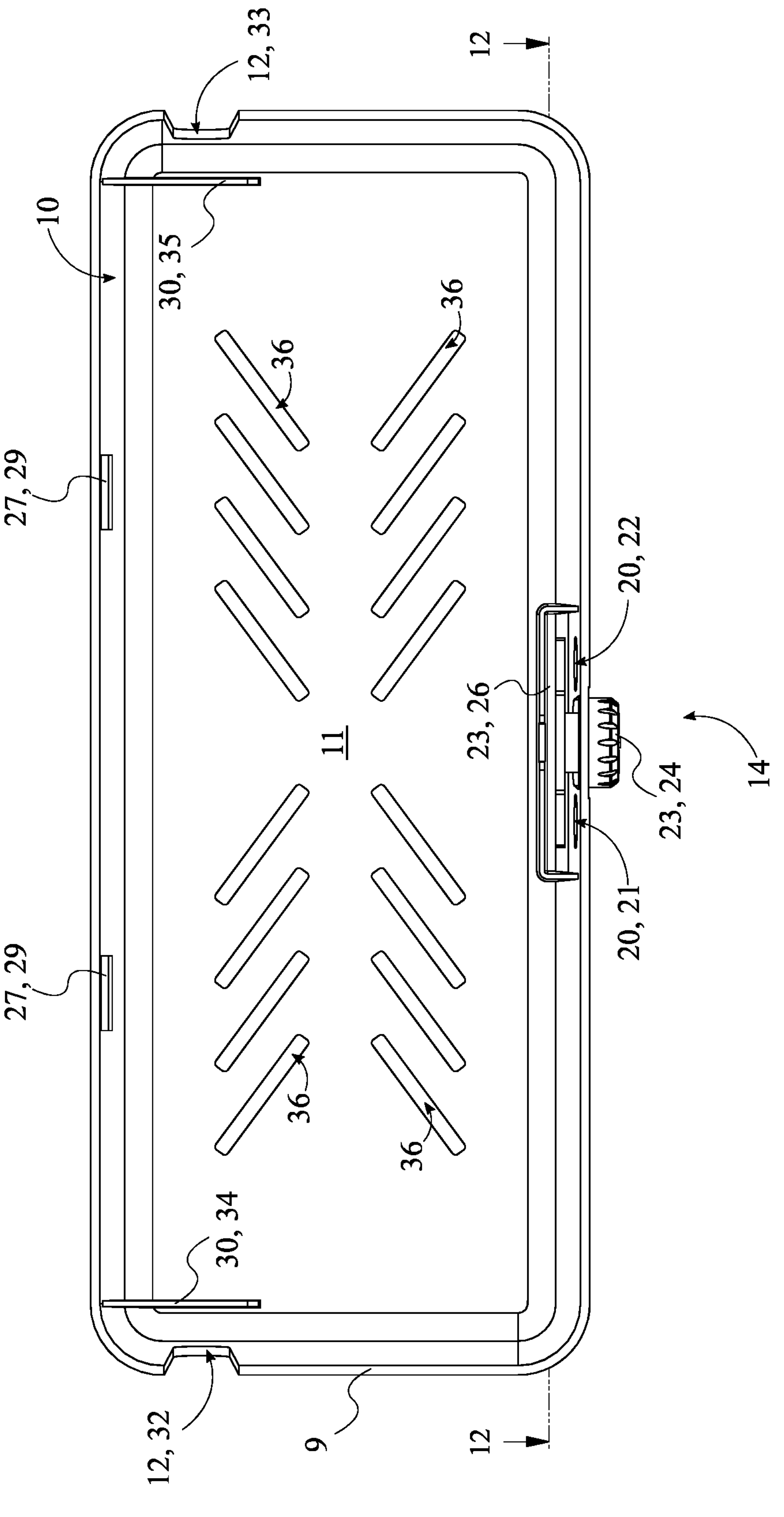
FIG. 11 is a top view of the box body of the present invention, wherein the lever stopper has been rotated by the hand wheel of the dial lock.
Figure 12:
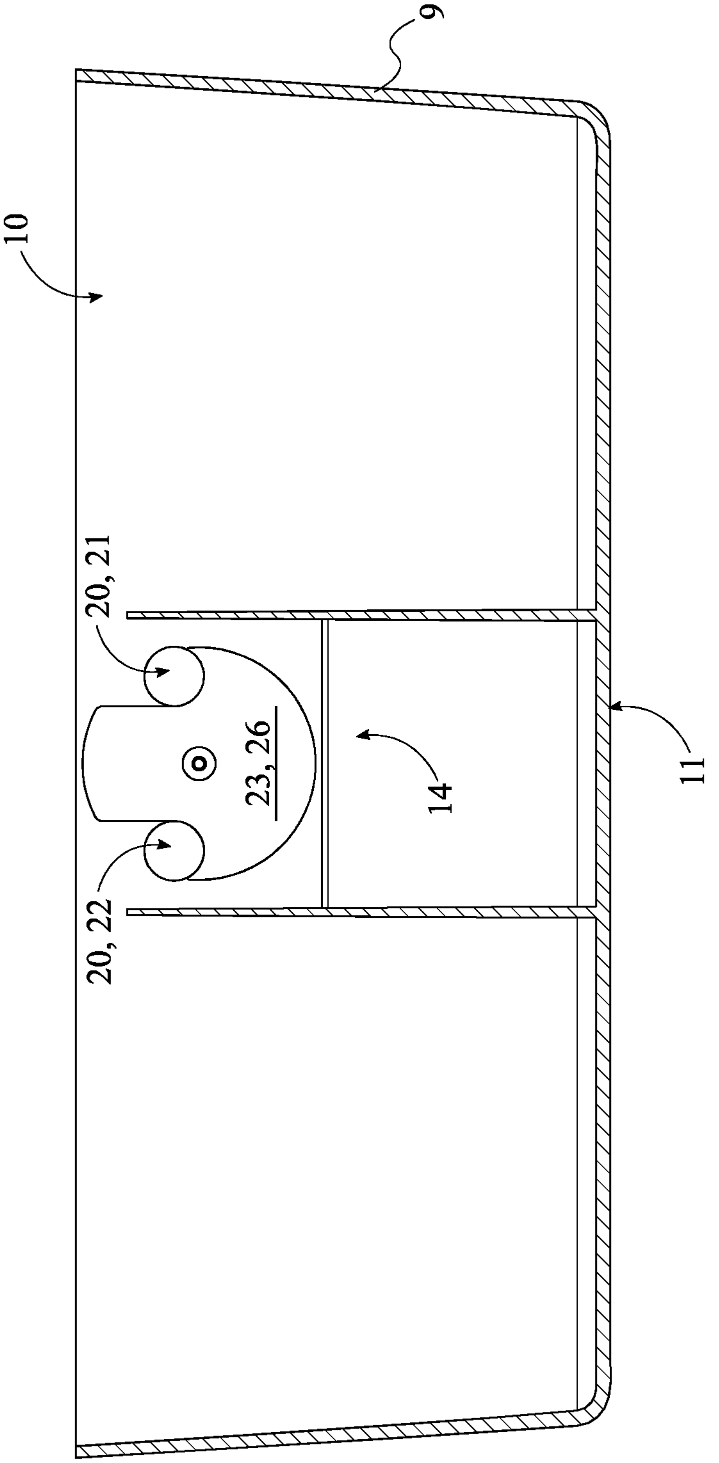
FIG. 12 is a horizontal cross-sectional view taken in the direction of line 12-12 in FIG. 11.

All illustrations of the drawings are for the purpose of describing selected versions of the present invention and are not intended to limit the scope of the present invention.

The present invention is a safety cover box that is used to prevent unauthorized access to an electrical device stored within. The present invention is preferably designed to prevent harmful accidents by restricting access to the electrical device to vulnerable users such as children or pets. As can be seen in FIG. 1 through 4, to do so, the present invention may comprise a safety lid 1, a box body 9, and a safety lock mechanism 14. The box body 9 is designed to completely enclose the electrical device so that all electrical connections are safely protected. The box body 9 also enables the normal operation of the electrical device without obstructing the connection of external electrical devices to the electrical device stored within the box body 9. The safety lid 1 is designed to seal the box body 9 to prevent access to the electrical device stored within. The safety lock mechanism 14 is designed so that only authorized users can remove the safety lid 1 from the box body 9.

The general configuration of the aforementioned components prevents potential accidents by restricting vulnerable users such as children from touching electrical connections. As can be seen in FIG. 5 through 12, the box body 9 is designed to match the shape and size of the electrical device to be stored within. The box body 9 is preferably a rectangular hollow structure with a size big enough to enclose an electrical device, such as a power strip. To do so, the box body 9 comprises an open base 10, a closed base 11, and at least one side opening 12. The open base 10 is preferably the largest opening of the box body 9 that enables the electrical device to be inserted into the box body 9. The closed base 11 retains the electrical device within the box body 9. The at least one side opening 12 enables power cables to be inserted into the box body 9 to not obstruct the connections of the electrical device to external electrical devices. Further, the safety lock mechanism 14 comprises a first locking member 15 and a second locking member 20. The first locking member 15 and the second locking member 20 are designed to selectively engage with each other to prevent unauthorized access to the electrical device. The open base 10 is positioned opposite to the closed base 11 about the box body 9 due to the rectangular shape of the box body 9. The at least one side opening 12 is positioned adjacent to the open base 10. In addition, the at least one side opening 12 is laterally integrated into the box body 9. This way, the power cables can be inserted laterally into the box body 9 to not obstruct with the open base 10. In addition, the first locking member 15 is peripherally positioned on the safety lid 1 and mounted onto the safety lid 1 so that the first locking member 15 is securely connected to the safety lid 1. On the other hand, the second locking member 20 is positioned adjacent to the open base 10 and laterally integrated into the box body 9. The positioning of the first locking member 15 matches the positioning of the second locking member 20. This way, when the safety lid 1 is positioned coextensive with the open base 10, the first locking member 15 engages with the second locking member 20 and securely connects the safety lid 1 to the box body 9. In other embodiments, the box body 9 can have a non-symmetrical design or a size large enough to retain more than one electrical device.

As can be seen in FIGS. 1 through 4, 13, and 14, the safety lid 1 is designed to match the shape and size of the open base 10. So, the safety lid 1 may comprise a first lid face 2, a second lid face 3, a first lengthwise edge 4, a second lengthwise edge 5, a first widthwise edge 6, and a second widthwise edge 7. The first lid face 2 and the second lid face 3 correspond to the overall flat faces of the safety lid 1 due to the overall thin structure of the safety lid 1. The first lengthwise edge 4 and the second lengthwise edge 5 preferably correspond to the largest sides of the safety lid 1, while the first widthwise edge 6 and the second widthwise edge 7 preferably correspond to the shortest sides of the safety lid 1. Due to the overall thin design of the safety lid 1, the first lid face 2 is positioned opposite to the second lid face 3 about the safety lid 1. In addition, due to the box body 9 having an overall rectangular shape, the safety lid 1 also has a rectangular shape. So, the first lengthwise edge 4 is positioned opposite to the second lengthwise edge 5 across the safety lid 1. Likewise, the first widthwise edge 6 is positioned opposite to the second widthwise edge 7 across the safety lid 1. Further, the first locking member 15 is centered along the first lengthwise edge 4 and mounted onto the second lid face 3. This way, when sealing the box body 9, the second lid face 3 is oriented towards the open base 10 so that the first locking member 15 can engage with the second locking member 20 on the box body 9.

Figure 13:
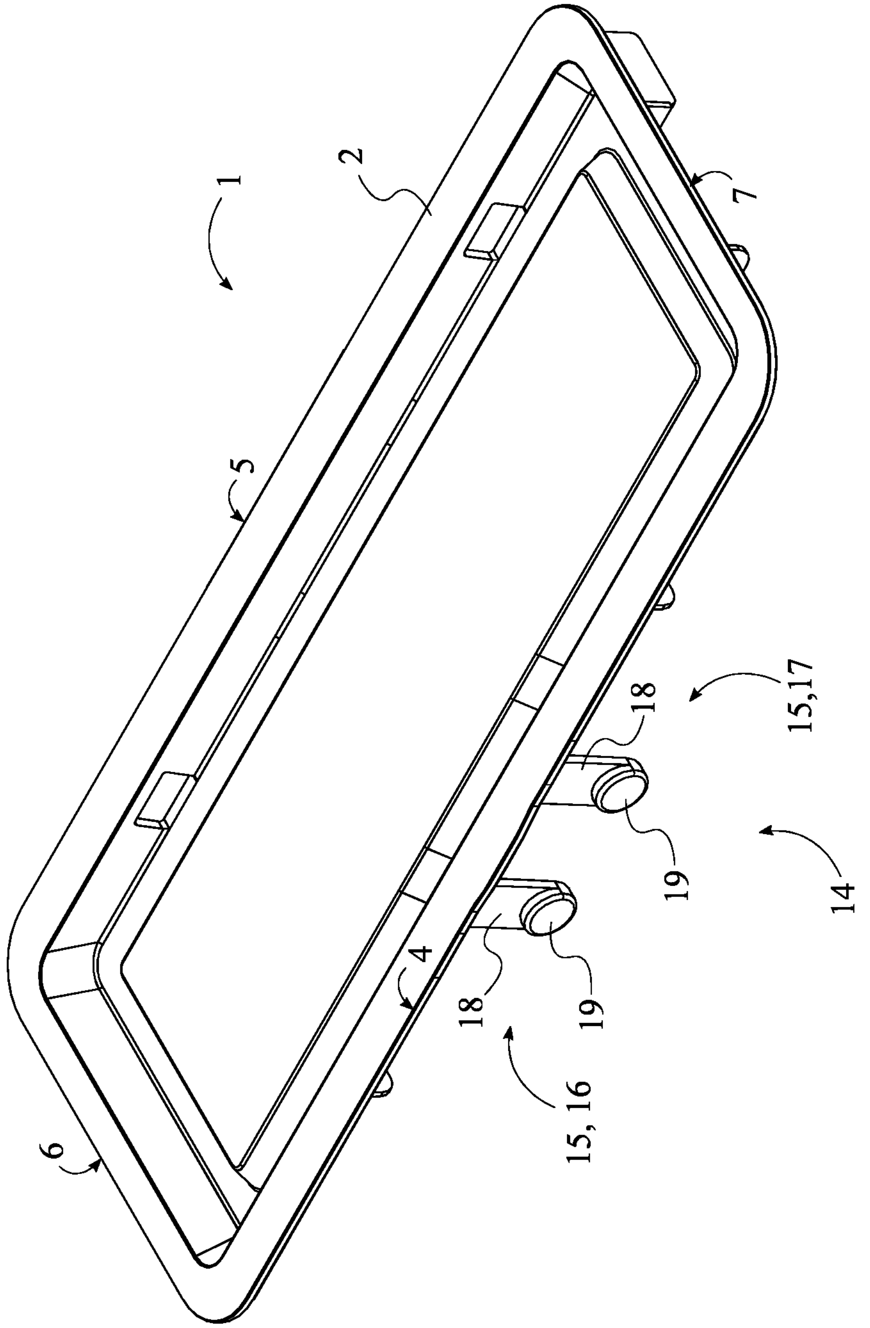
FIG. 13 is a top front perspective view of the safety lid of the present invention.
Figure 14:
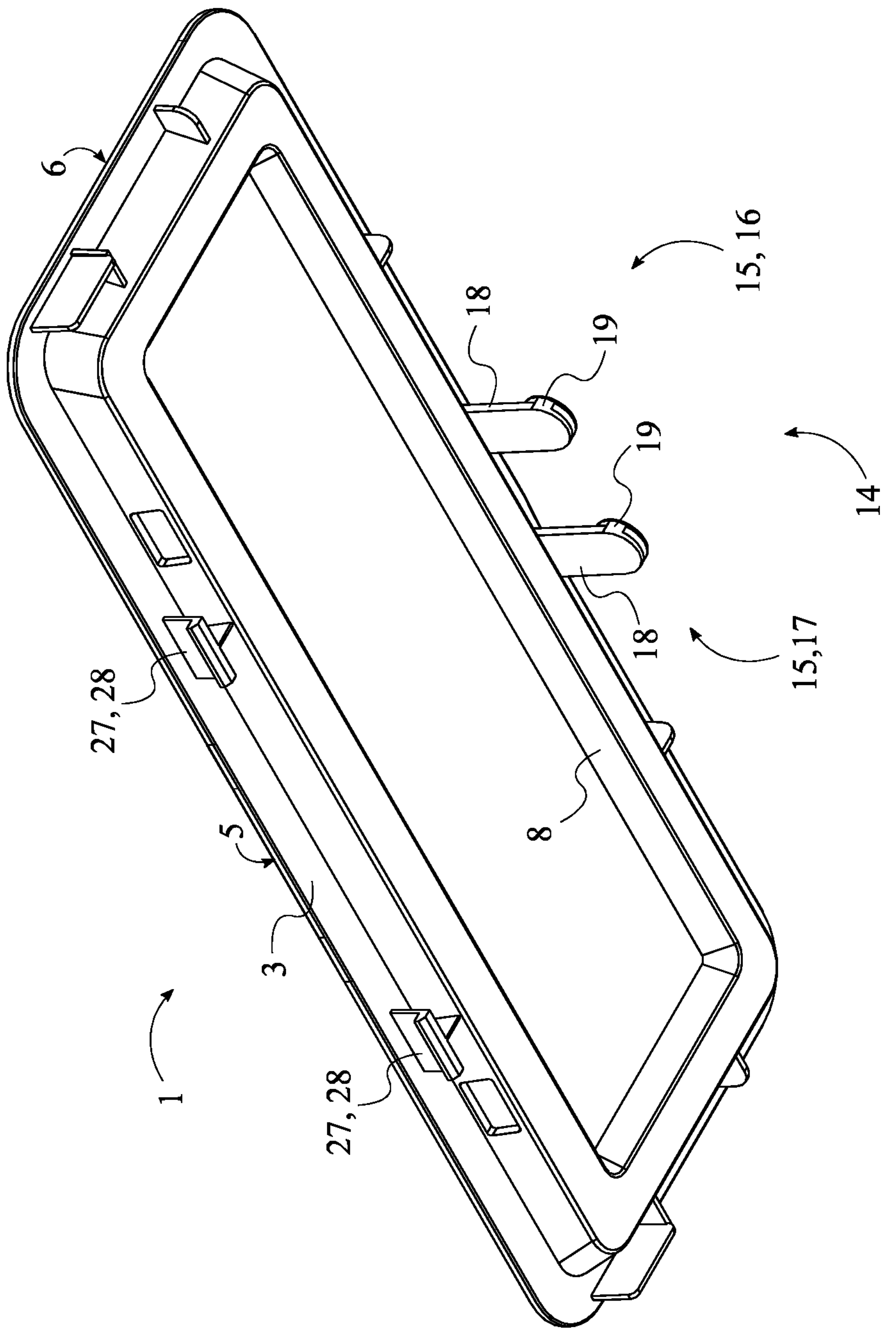
FIG. 14 is a bottom rear perspective view of the safety lid of the present invention.

In some embodiments, the safety lid 1 is preferably designed to be easily handled with one hand. To do so, the safety lid 1 may further comprise an inner lip 8. As can be seen in FIGS. 13 and 14, the inner lip 8 is formed by a recession on the safety lid 1 that runs from the first lid face 2 to the second lid face 3. The recession is large enough to enable the fingers of the user to have a good grasp on the safety lid 1. The inner lip 8 is peripherally positioned around the safety lid 1 and mounted onto the second lid face 3. This way, when the safety lid 1 is positioned coextensive with the open base 10, the inner lip 8 is positioned within the box body 9. The inner lip 8 also helps to seal the connection between the safety lid 1 and the box body 9. In other embodiments, the safety lid 1 may also include one or more lid openings that can be used to better grab onto the safety lid 1 using one or two fingers.

While the inner lip 8 helps seal the connection between the safety lid 1 and the box body 9, the safety lid 1 may be able to be opened from the sides that are not joined by the safety lock mechanism 14. As can be seen in FIGS. 1 through 4, 13, and 14, to prevent this, the present invention may further comprise a lid sealing mechanism 27. The lid sealing mechanism 27 is designed to prevent the safety lid 1 from being opening from the sides where the safety lock mechanism 14 does not join the safety lid 1 to the box body 9. To do so, the lid sealing mechanism 27 comprise a pair of hooks 28 and a pair of protrusions 29. The pair of hooks 28 and the pair of protrusions 29 are designed to frictionally engage with each other when the safety lid 1 is positioned coextensive with the open base 10. The pair of hooks 28 is distributed along the second lengthwise edge 5 to not obstruct with the safety lock mechanism 14. The pair of hooks 28 is also mounted onto the second lid face 3 so that when the second lid face 3 is positioned coextensive with the open base 10, the pair of hooks 28 are positioned within the box body 9. On the other hand, the pair of protrusions 29 is positioned opposite to the second locking member 20 on the box body 9. The pair of protrusions 29 is positioned adjacent to the open base 10 to match the positioning of the pair of hooks 28. Further, the pair of protrusions 29 is mounted within the box body 9. This way, when the safety lid 1 is positioned coextensive with the open base 10, each of the pair of hooks 28 is frictionally engaged with the corresponding protrusion of the pair of protrusions 29. Thus, unauthorized users are unable to remove the safety lid 1 from the other sides of the safety lid 1 not being joined by the safety lock mechanism 14. In other embodiments, the lid sealing mechanism 27 may be replaced with other mechanical connections, such as a hinge mechanism.

Small users such as children may try to insert fingers through the at least one side opening 12. As can be seen in FIG. 1 through 12, to prevent such action, the present invention may further comprise at least one opening blocker 30. The at least one opening blocker 30 is designed to enable the insertion of power cords through the at least one side opening 12 while also blocking the entrance of fingers or other objects through the at least one side opening 12. To do so, the at least one opening blocker 30 is positioned adjacent to the at least one side opening 12 to block the entrance of large objects. The at least one opening blocker 30 is preferably a thin wall positioned offset to the at least one side opening 12 to leave a small space through which the power cords can be run through. The thin wall is large enough to span the width and length of the at least one side opening 12. The at least one opening blocker 30 is preferably positioned parallel to the side wall on which the at least one side opening 12 is positioned. The at least one opening blocker 30 is also mounted within the box body 9 so that the at least one opening blocker 30 cannot be removed from the box body 9.

As can be seen in FIG. 1 through 12, to help with the organization of the several power cords connected to the electrical device within the box body 9, the at least one opening blocker 30 may comprise a plurality of indentations 31. The plurality of indentations 31 includes cuts of different shapes and sizes large enough to retain the power cords separate from each other. To do so, the plurality of indentations 31 is oriented towards the safety lock mechanism 14 due to the at least one opening blocker 30 being connected to the side wall opposite to the side wall where the safety lock mechanism 14 is located. Further, the plurality of indentations 31 is distributed along the at least one opening blocker 30. This way, each power cord can be engaged with a specific indentation of the plurality of indentations 31, keeping the power cords separate from each other while the power cords are connected to the electrical device within the box body 9.

As can be seen in FIG. 1 through 12, to further help with the organization of the power cords connected to the electrical device within the box body 9, the at least one side opening 12 may be a first side opening 32 and a second side opening 33. Similarly, the at least one opening blocker 30 is a first opening blocker 34 and a second opening blocker 35. The first side opening 32 is positioned opposite to the second side opening 33 across the box body 9 so that the different power cords can be run through different side openings to prevent tangling. Further, the first opening blocker 34 is positioned offset to the first side opening 32 while the second opening blocker 35 is positioned offset to the second side opening 33. Thus, the unauthorized users are unable to access the electrical device in the box body 9 through neither of the side openings. In other embodiments, the present invention may utilize different means of organizing the power cords or other electrical connections.

As can be seen in FIG. 1 through 12, the electrical connections within the box body 9 may generate excess heat that can be dangerous to contain within the box body 9. To help dissipate the heat, the present invention may further comprise a plurality of base vents 36. The plurality of base vents 36 is designed to enable air flow through the closed base 11 to dissipate heat. The plurality of base vents 36 also helps drain any undesired liquids that may have accidentally entered the box body 9. To do so, the plurality of base vents 36 is distributed along the closed base 11. Further, the plurality of base vents 36 traverses through the closed base 11. This way, air can flow through the closed base 11 and also fluids can be drained through the closed base 11. In some embodiments, the closed base 11 can also include a plurality of legs that elevate the closed base 11 from the ground. The plurality of legs is distributed about the closed base 11 and is positioned opposite to the open base 10. In other embodiments, other safety features can be included in the box body 9.

As previously discussed, the safety lock mechanism 14 prevents unauthorized access to the electrical device stored within the box body 9 in a quick and efficient manner. As can be seen in FIG. 1 through 12, the safety lock mechanism 14 is preferably designed in such a way that vulnerable users such as children may not be able to easily figure out the lock mechanism. To do so, the first locking member 15 may comprise a first lever 16 and a second lever 17 while the second locking member 20 may comprise a first hole 21 and a second hole 22. The first lever 16 and the second lever 17 are thin protrusions flexible enough to be bent as the safety lid 1 is positioned coextensive with the open base 10. Once the safety lid 1 is in position, the first lever 16 and the second lever 17 engage with the first hole 21 and the second hole 22, respectively, to lock the connection between the safety lid 1 and the box body 9. The first lever 16 and the second lever 17 each comprises a lever body 18 and a lever head 19. The lever body 18 is preferably a thin rectangular structure, while the lever head 19 is a round protrusion matching the shape and size of the hole. The lever head 19 is terminally connected to the lever body 18, while the lever body 18 is positioned geometrical normal to the safety lid 1. This way, the lever body 18 is securely connected to the safety lid 1 so that the corresponding lever may not be easily removed from the safety lid 1 by force. The first lever 16 is positioned offset to the second lever 17 to separate the first lever 16 from the second lever 17. Similarly, the first hole 21 is positioned offset to the second hole 22 to match the positioning of the first lever 16 and the second lever 17. This way, the safety lid 1 is more securely connected to the box body 9 to not enable unauthorized users from trying to bend the safety lid 1. To lock the safety lid 1 to the box body 9, the second lid face 3 is oriented towards the open base 10 and the safety lid 1 is positioned coextensive with the open base 10. The lever body 18 bends as the safety lid 1 is positioned on the open base 10. Once the safety lid 1 is coextensive with the open base 10, the lever head 19 of the first lever 16 is inserted into the first hole 21, while the lever head 19 of the second lever 17 is inserted into the second hole 22. To remove the safety lid 1 from the box body 9, the user pushes the lever head 19 into the corresponding hole, releasing the lever body 18 from the box body 9. Then, the user can remove the safety lid 1 from the box body 9.

In case the unauthorized user is able to work the safety lock mechanism 14, the safety lock mechanism 14 may further comprise a dial lock 23. As can be seen in FIG. 1 through 12, the dial lock 23 is designed to complicate the access to the electrical device within the box body 9 by the unauthorized users. To do so, the dial lock 23 comprises a hand wheel 24, an axle 25, and a lever stopper 26. The hand wheel 24 is designed with a combination of letters and/or numbers that enable only the authorized user to know how to open the dial lock 23. The lever stopper 26 limits the movement of the first lever 16 and the second lever 17 if the hand wheel 24 is not rotated to the correct position. The axle 25 connects the lever stopper 26 to the hand wheel 24. In addition, the box body 9 comprises a third hole 13 that receives the dial lock 23. The third hole 13 is positioned in between the first hole 21 and the second hole 22 to position the dial lock 23 adjacent to the first lever 16 and the second lever 17. Like the first hole 21 and the second hole 22, the third hole 13 traverses through the box body 9. The axle 25 is inserted into the third hole 13 so that the axle 25 is restricted to only rotate within the third hole 13. The hand wheel 24 is terminally connected to the axle 25 so that the rotation of the hand wheel 24 makes the axle 25 rotate as well. In addition, the hand wheel 24 is externally and rotatably connected to the box body 9 so that the hand wheel 24 cannot be removed from the box body 9.

On the other hand, the lever stopper 26 is terminally connected to the axle 25, opposite to the hand wheel 24, so that the rotation of the axle 25 by the hand wheel 24 also causes the lever stopper 26 to rotate accordingly. As can be seen in FIG. 1 through 12, the lever stopper 26 preferably has shape that needs to be positioned in an unlocked position to not obstruct with the movement of the lever body 18. If the lever stopper 26 is rotated to an alternate position not matching the unlocked position, the lever body 18 is positioned in between the box body 9 and the lever stopper 26, thus preventing the user from disengaging the first lever 16 and the second lever 17 from the first hole 21 and the second hole 22, respectively. In some embodiments, the lever stopper 26 has a shape similar to a wide double-frog hook that is wide enough to block the movement of the lever body 18. When the lever stopper 26 is rotated to position the first lever 16 and the second lever 17 in space between the two wide ends of the lever stopper 26, only then the first lever 16 and the second lever 17 can be disengaged. The hand wheel 24 includes markings that indicate the positioning of the lever stopper 26 within the box body 9. Only the authorized user should know the marking that corresponds to the position of the lever stopper 26 where the first lever 16 and the second lever 17 can be disengaged. This way, unauthorized users may try to rotate the hand wheel 24 to different positions but are unable to disengage the first lever 16 and the second lever 17. In other embodiments, the dial lock 23 may be modified to utilize more complicated locking mechanisms.

Although the invention has been explained in relation to its preferred embodiment, it is to be understood that many other possible modifications and variations can be made without departing from the spirit and scope of the invention.

What is claimed is:

1. A safety cover box comprising:
a safety lid;
a box body;
a safety lock mechanism;
the box body comprising an open base, a closed base, and at least one side opening;
the safety lock mechanism comprising a first locking member and a second locking member;
the open base being positioned opposite to the closed base about the box body;
the at least one side opening being positioned adjacent to the open base;
the at least one side opening being laterally integrated into the box body;
the first locking member being peripherally positioned on the safety lid;
the first locking member being mounted onto the safety lid;
the second locking member being positioned adjacent to the open base;
the second locking member being laterally integrated into the box body;
the safety lid being positioned coextensive with the open base; and
the first locking member being engaged with the second locking member;
at least one opening blocker;
the at least one opening blocker being positioned adjacent to the at least one side opening;
the at least one opening blocker being positioned offset to the at least one side opening; and
the at least one opening blocker being mounted within the box body.

2. The safety cover box as claimed in claim 1 comprising:
the safety lid comprising a first lid face, a second lid face, a first lengthwise edge, a second lengthwise edge, a first widthwise edge, and a second widthwise edge;
the first lid face being positioned opposite to the second lid face about the safety lid;
the first lengthwise edge being positioned opposite to the second lengthwise edge across the safety lid;
the first widthwise edge being positioned opposite to the second widthwise edge across the safety lid;
the first locking member being centered along the first lengthwise edge; and
the first locking member being mounted onto the second lid face.

3. The safety cover box as claimed in claim 2 comprising:
the safety lid further comprising an inner lip;
the inner lip being peripherally positioned around the safety lid; and
the inner lip being mounted onto the second lid face.

4. The safety cover box as claimed in claim 2 comprising:
a lid sealing mechanism;
the lid sealing mechanism comprising a pair of hooks and a pair of protrusions;
the pair of hooks being distributed along the second lengthwise edge;
the pair of hooks being mounted onto the second lid face;
the pair of protrusions being positioned opposite to the second locking member;
the pair of protrusions being positioned adjacent to the open base;
the pair of protrusions being mounted within the box body; and
each of the pair of hooks being frictionally engaged with the corresponding protrusion of the pair of protrusions.

5. The safety cover box as claimed in claim 1 comprising:
the at least one opening blocker comprising a plurality of indentations;
the plurality of indentations being oriented towards the safety lock mechanism; and
the plurality of indentations being distributed along the at least one opening blocker.

6. The safety cover box as claimed in claim 1 comprising:
the at least one side opening being a first side opening and a second side opening;
the at least one opening blocker being a first opening blocker and a second opening blocker;
the first side opening being positioned opposite to the second side opening across the box body;
the first opening blocker being positioned offset to the first side opening; and
the second opening blocker being positioned offset to the second side opening.

7. The safety cover box as claimed in claim 1 comprising:
a plurality of base vents;
the plurality of base vents being distributed along the closed base; and
the plurality of base vents traversing through the closed base.

8. The safety cover box as claimed in claim 1 comprising:
the first locking member comprising a first lever and a second lever;
the second locking member comprising a first hole and a second hole;
the first lever and the second lever each comprising a lever body and a lever head;
the lever head of the first lever being terminally connected to the lever body of the first lever;
the lever head of the second lever being terminally connected to the lever body of the second lever;
the lever body of the first lever being positioned geometrical normal to the safety lid;
the lever body of the second lever being positioned geometrical normal to the safety lid;
the first lever being positioned offset to the second lever;
the first hole being positioned offset to the second hole;
the lever head of the first lever being inserted into the first hole; and
the lever head of the second lever being inserted into the second hole.

9. The safety cover box as claimed in claim 8 comprising:
the safety lock mechanism further comprising a dial lock;
the dial lock comprising a hand wheel, an axle, and a lever stopper;
the box body comprising a third hole;
the third hole being positioned in between the first hole and the second hole;
the third hole traversing through the box body;
the axle being inserted into the third hole;
the hand wheel being terminally connected to the axle;

the hand wheel being externally and rotatably connected to the box body;
the lever stopper being positioned opposite to the hand wheel across the axle;
the lever stopper being terminally connected to the axle; and
the lever body being positioned in between the box body and the lever stopper.

10. A safety cover box comprising:
a safety lid;
a box body;
a safety lock mechanism;
at least one opening blocker;
a plurality of base vents;
the box body comprising an open base, a closed base, and at least one side opening;
the safety lock mechanism comprising a first locking member and a second locking member;
the open base being positioned opposite to the closed base about the box body;
the at least one side opening being positioned adjacent to the open base;
the at least one side opening being laterally integrated into the box body;
the first locking member being peripherally positioned on the safety lid;
the first locking member being mounted onto the safety lid;
the second locking member being positioned adjacent to the open base;
the second locking member being laterally integrated into the box body;
the safety lid being positioned coextensive with the open base;
the first locking member being engaged with the second locking member;
the at least one opening blocker being positioned adjacent to the at least one side opening;
the at least one opening blocker being positioned offset to the at least one side opening;
the at least one opening blocker being mounted within the box body;
the plurality of base vents being distributed along the closed base; and
the plurality of base vents traversing through the closed base.

11. The safety cover box as claimed in claim 10 comprising:
the safety lid comprising a first lid face, a second lid face, a first lengthwise edge, a second lengthwise edge, a first widthwise edge, a second widthwise edge, and an inner lip;
the first lid face being positioned opposite to the second lid face about the safety lid;
the first lengthwise edge being positioned opposite to the second lengthwise edge across the safety lid;
the first widthwise edge being positioned opposite to the second widthwise edge across the safety lid;
the first locking member being centered along the first lengthwise edge;
the first locking member being mounted onto the second lid face;
the inner lip being peripherally positioned around the safety lid; and
the inner lip being mounted onto the second lid face.

12. The safety cover box as claimed in claim 11 comprising:
a lid sealing mechanism;
the lid sealing mechanism comprising a pair of hooks and a pair of protrusions;
the pair of hooks being distributed along the second lengthwise edge;
the pair of hooks being mounted onto the second lid face;
the pair of protrusions being positioned opposite to the second locking member;
the pair of protrusions being positioned adjacent to the open base;
the pair of protrusions being mounted within the box body; and
each of the pair of hooks being frictionally engaged with the corresponding protrusion of the pair of protrusions.

13. The safety cover box as claimed in claim 10 comprising:
the at least one opening blocker comprising a plurality of indentations;
the plurality of indentations being oriented towards the safety lock mechanism; and
the plurality of indentations being distributed along the at least one opening blocker.

14. The safety cover box as claimed in claim 10 comprising:
the at least one side opening being a first side opening and a second side opening;
the at least one opening blocker being a first opening blocker and a second opening blocker;
the first side opening being positioned opposite to the second side opening across the box body;
the first opening blocker being positioned offset to the first side opening; and
the second opening blocker being positioned offset to the second side opening.

15. The safety cover box as claimed in claim 10 comprising:
the safety lock mechanism further comprising a dial lock;
the dial lock comprising a hand wheel, an axle, and a lever stopper;
the first locking member comprising a first lever and a second lever;
the second locking member comprising a first hole and a second hole;
the box body comprising a third hole;
the first lever and the second lever each comprising a lever body and a lever head;
the lever head of the first lever being terminally connected to the lever body of the first lever;
the lever head of the second lever being terminally connected to the lever body of the second lever;
the lever body of the first lever being positioned geometrical normal to the safety lid;
the lever body of the second lever being positioned geometrical normal to the safety lid;
the first lever being positioned offset to the second lever;
the first hole being positioned offset to the second hole;
the lever head of the first lever being inserted into the first hole;
the lever head of the second lever being inserted into the second hole;

the third hole being positioned in between the first hole and the second hole;
the third hole traversing through the box body;
the axle being inserted into the third hole;
the hand wheel being terminally connected to the axle;
the hand wheel being externally and rotatably connected to the box body;
the lever stopper being positioned opposite to the hand wheel across the axle;
the lever stopper being terminally connected to the axle; and
the lever body being positioned in between the box body and the lever stopper.

16. A safety cover box comprising:
a safety lid;
a box body;
a safety lock mechanism;
at least one opening blocker;
a plurality of base vents;
the box body comprising an open base, a closed base, and at least one side opening;
the safety lock mechanism comprising a first locking member and a second locking member;
the at least one opening blocker comprising a plurality of indentations;
the open base being positioned opposite to the closed base about the box body;
the at least one side opening being positioned adjacent to the open base;
the at least one side opening being laterally integrated into the box body;
the first locking member being peripherally positioned on the safety lid;
the first locking member being mounted onto the safety lid;
the second locking member being positioned adjacent to the open base;
the second locking member being laterally integrated into the box body;
the safety lid being positioned coextensive with the open base;
the first locking member being engaged with the second locking member;
the at least one opening blocker being positioned adjacent to the at least one side opening;
the at least one opening blocker being positioned offset to the at least one side opening;
the at least one opening blocker being mounted within the box body;
the plurality of base vents being distributed along the closed base;
the plurality of base vents traversing through the closed base;
the plurality of indentations being oriented towards the safety lock mechanism; and
the plurality of indentations being distributed along the at least one opening blocker.

17. The safety cover box as claimed in claim 16 comprising:
a lid sealing mechanism;
the lid sealing mechanism comprising a pair of hooks and a pair of protrusions;
the safety lid comprising a first lid face, a second lid face, a first lengthwise edge, a second lengthwise edge, a first widthwise edge, a second widthwise edge, and an inner lip;
the first lid face being positioned opposite to the second lid face about the safety lid;
the first lengthwise edge being positioned opposite to the second lengthwise edge across the safety lid;
the first widthwise edge being positioned opposite to the second widthwise edge across the safety lid;
the first locking member being centered along the first lengthwise edge;
the first locking member being mounted onto the second lid face;
the inner lip being peripherally positioned around the safety lid;
the inner lip being mounted onto the second lid face;
the pair of hooks being distributed along the second lengthwise edge;
the pair of hooks being mounted onto the second lid face;
the pair of protrusions being positioned opposite to the second locking member;
the pair of protrusions being positioned adjacent to the open base;
the pair of protrusions being mounted within the box body; and
each of the pair of hooks being frictionally engaged with the corresponding protrusion of the pair of protrusions.

18. The safety cover box as claimed in claim 16 comprising:
the at least one side opening being a first side opening and a second side opening;
the at least one opening blocker being a first opening blocker and a second opening blocker;
the first side opening being positioned opposite to the second side opening across the box body;
the first opening blocker being positioned offset to the first side opening; and
the second opening blocker being positioned offset to the second side opening.

19. The safety cover box as claimed in claim 16 comprising:
the safety lock mechanism further comprising a dial lock;
the dial lock comprising a hand wheel, an axle, and a lever stopper;
the first locking member comprising a first lever and a second lever;
the second locking member comprising a first hole and a second hole;
the box body comprising a third hole;
the first lever and the second lever each comprising a lever body and a lever head;
the lever head of the first lever being terminally connected to the lever body of the first lever;
the lever head of the second lever being terminally connected to the lever body of the second lever;
the lever body of the first lever being positioned geometrical normal to the safety lid;
the lever body of the second lever being positioned geometrical normal to the safety lid;
the first lever being positioned offset to the second lever;
the first hole being positioned offset to the second hole;
the lever head of the first lever being inserted into the first hole;
the lever head of the second lever being inserted into the second hole;

the third hole being positioned in between the first hole and the second hole;
the third hole traversing through the box body;
the axle being inserted into the third hole;
the hand wheel being terminally connected to the axle;
the hand wheel being externally and rotatably connected to the box body;
the lever stopper being positioned opposite to the hand wheel across the axle;
the lever stopper being terminally connected to the axle; and
the lever body being positioned in between the box body and the lever stopper.

* * * * *